United States Patent [19]

Polaert

[11] Patent Number: 4,784,475

[45] Date of Patent: Nov. 15, 1988

[54] OPTICAL RELAY WHOSE TARGET IS COOLED BY A CONTROLLED TEMPERATURE GRADIENT HEAT EXCHANGER

[75] Inventor: Rémy H. F. Polaert, Villecresnes, France

[73] Assignee: U.S. Philips Corporation, New York, N.Y.

[21] Appl. No.: 119,007

[22] Filed: Nov. 10, 1987

[30] Foreign Application Priority Data

Nov. 21, 1986 [FR] France ........................ 86 16233

[51] Int. Cl.$^4$ ............................ G02F 1/01; G02F 1/03
[52] U.S. Cl. ........................................ 350/355; 350/356
[58] Field of Search ................ 350/355, 354, 356; 358/230, 231, 232, 237, 242

[56] References Cited

FOREIGN PATENT DOCUMENTS 1473212 3/1967 France .
1479284 3/1967 France .

Primary Examiner—Eugene R. LaRoche
Assistant Examiner—Nathan W. McCutcheon
Attorney, Agent, or Firm—F. Brice Faller

[57] ABSTRACT

Optical relay for projection television includes a target (12, 31) of an electrically insulating material which allows the light to pass in a manner depending on the electric field parallel to the direction or propagation of this light. An electron beam scans a first face of this target scanned by an electron beam and an anode (30) receives the secondary electrons emitted in response to the action of the beam. An optically transparent and electrically conducting plate 38 is provided against the second face of the target receive the electric signal conveying the video information. The target is made of a material which becomes ferroelectric, and a heat exchanger (18) is connected to a heat source which maintains the temperature of the target. In the normal mode of operation the target is formed by a useful central zone where it exhibits a single domain ferroelectric phase and a neutral peripheral zone, having a temperature much higher than the Curie temperature where it exhibits a paraelectric phase. The target is cemented to a plate (32) which is provided at its periphery with a collar (33) which is a very good heat conductor and is maintained at a temperature T1 by means of at least one thermal bridge (37) connected to the collar and to a reference source (39) kept at a temperature T0. The plate is cemented to a plate support (34) which is kept at a temperature T2 so that the plate has an annular zone in which a temperature gradient T1-T2 exists.

5 Claims, 3 Drawing Sheets

OPTICAL RELAY WHOSE TARGET IS COOLED BY A CONTROLLED TEMPERATURE GRADIENT HEAT EXCHANGER

BACKGROUND OF THE INVENTION

The invention relates to an optical relay having a target of electrically insulating material which allows light to pass in a manner depending on the electric field parallel to the direction of propagation of this light. An electron beam scans a first face of this target and an anode receives the secondary electrons transmitted in response to the action of the beam. An optically transparent and electrically conducting plate is provided against the second face of the target to receive the electric signal conveying the video information and thus forming the control electrode. The target is made of a material which becomes ferro-electric below a given temperature, the Curie temperature. A heat exchanger is connected to a heat source which maintains the temperature necessary for its operation and acts on the target. The target is bonded to a plate of an adequately heat conducting material, so that during the normal mode of operation the target is formed by:

a useful central zone where it exhibits a single-domain ferro-electric phase, and a neutral peripheral zone having a temperature higher than the Curie temperature, where it exhibits a paraelectric phase.

An optical relay of this type for projecting televison pictures, is disclosed in the French patent specification Nos. 1,473,212 and 1,479,284. For a more detailed characterization of the invention the operating principle of this optical relay follows hereafter. More details can be found in the above documents.

The framework of the invention relates to the conversion of a time-variable electric signal which represents the video information, into a visible picture. This is one of the functions of a televison receiver.

In the "picture" tube of such a receiver the electron beam conventionally performs the three fundamental functions of this conversion:

f1—it produces the energy which is to appear in the form of light: the light output of the tube is consequently always less than the power transferred by the beam;

f2—it scans the surface of the picture;

f3—it provides the visual information.

Because of, inter alia, the functions f2 and f3, the beam power and hence the picture brightness cannot be raised to an extent as is required for projection on, for example, a large screen.

It has therefore been proposed to separate these functions and to have the function f1 performed by, for example, an arc lamp, the functions f2 and f3 by what is commonly referred to as an "optical relay". Such a relay uses a crystal exhibiting an electro-optical effect, denoted the "Pockels" effect. A crystal of double acid potassium phosphate $KH_2PO_4$ termed KDP hereinafter, is suitable for this purpose.

According to the Pockels effect, when an electrically insulating crystal is exposed to an electric field parallel to its crystal axis c (the three crystal axes a, b and c form a trieder of three rectangles, in this case the axis c being the optical axis), the index n of this crystal for light rays propagating in the direction c and being linearly polarized in the ab-plane, depends on the direction of this polarization. Put more accurately, if X and Y designate the bisectors of the axes a and b, and if the parameters of the crystal with respect to these different directions are designated by the letters used for these directions, the diagram of the indices in the abplane becomes an ellipse having X and Y axes instead of becoming a circle, and that difference $(n_x - n_y)$ is proportional to the applied electric field. It follows that if the incident light rays are polarized parallel to the axis a, the luminous intensity I passing through an output polarizer will be $i = I_0 \sin^2 kV$ if the direction of polarization of this polarizer is parallel to the axis b, and $I = I_0 \cos^2 kV$ if the direction is parallel to the axis a. $I_o$ is the intensity of the incident light if no parasitic absorption occurs, V is the electrical potential difference between the two faces of the crystal, and k is a coefficient depending on the crystal material used.

To obtain a picture, by projection by means of a lamp via this assembly, it is sufficient, to apply an electric field parallel to the axis c and to cause the value of this field at any point of the plate to correspond to the brightness at the corresponding point of the picture to be obtained. For this purpose, an electron beam produced by an electron gun and passing through conventional deflection members, scans the target, thus performing the function f2. As for the function f3, that is to say here the control of the electric field, this function is also performed by the beam in the following manner.

When the electrons of the beam strike the target surface, they cause, if their energy is comprised between appropriate limits and to the extent in which the potential of the anode is sufficiently high, the emission of secondary electrons in a quantity exceeding the quantity of the incident electrons. This results in the electric potential of the point reached being increased, so that the potential difference between the anode and this point decreases. If the electrons of the beam reach this point in an adequate quantity, this potential difference becomes negative and reaches a value such ($-3V$ for example) that each incident electron no longer causes the emission of one single secondary electron. The potential in this point is thus fixed at a limited value relative to that of the anode. In this respect it is sufficient, taking account of the scanning rate, that the beam intensity is adequate. The anode potential being constant, each passage of the electron beam fixes, as has already been described in the foregoing, the potential at any point A of the surface at a value $V_0$, independent of this point and the instant of passage, However, the corresponding electric charge appearing in this point depends on the potential of the nearby control electrode, at the other side of the target.

If the potential of this electrode at the instant of passage is denoted VA, this charge is proportional to VO−VA, VA representing the value of the video information signal at the instant of its passage.

The target whose double refraction depends on the electric field, is constituted by a single crystal of KDP, in which approximately 95% of the hydrogen is formed by heavy hydrogen (deuterium).

The Pockels effect is proportional, for a given crystal width, to the charges appearing on the crystal surfaces and consequently, for a given control voltage, is proportional to the dielectric constant thereof. For that reason a target is used which is constituted by a crystal which becomes ferroelectric below a certain temperature, the Curie temperature, and advantageously the crystal is operated near this temperature, as then the dielectric constant reaches very high values and the optical relay can function by means of control voltages which are easy to handle (the Pockels effect being proportional to the product εV).

The most frequently used crystals exhibiting this phenomenon are acid salts, particularly of the KDP-type in the class of the quadratic crystals, the optical axis of which is parallel to the crystal axis c. Its Curie temperature is located near −53° C. Above the Curie temperature, the DKDP is a quadratic crystal of the symmetry class 42 m and it has a paraelectric behaviour. Below the Curie temperature the DKDP becomes orthorhombic, symmetry class mm2, and it exhibits a ferroelectric behaviour: locally there is spontantaneous polarization and the appearance of ferroelectric domains.

At the ambiant temperature, the crystal is anisotropic but in the proximity of the Curie point the anisotropy becomes extremely important. The change of state is accompanied by abrupt variations of the physical properties, along the crystal axis:
piezo-electric coefficients
electro-optic coefficients
dielectric constants $\epsilon_x$ and $\epsilon_z$.

Thus, the dielectric constant $\epsilon_z$ changes from a value of approximately 60 at the ambiant temperature to a value of 30,000 at the Curie temperature.

It is known, that, from the electro-optic point of view the apparent width e of the DKDP crystal is $$e = 1(\epsilon_x/\epsilon'_z)^{0.5}.$$

The target appears to be thinner according as the ratio $\epsilon_x/\epsilon_z$ is smaller wherein $\epsilon'_z$ is the value of $\epsilon_z$ when the crystal is mechanically blocked. Actually, in an optical relay, the monocrystalline DKDP sheet having a thickness 1 near 250 microns, is firmly cemented to a rigid support: a fluorine sheet 5 mm thick.

The target of the optical relay is then usually cooled to −51° C., that is to say to a temperature slightly above the Curie point. In these conditions $\epsilon_x/\epsilon'_z = 1/9$ and the apparent thickness of the crystal is approximately 80 microns, which gives the optical relay a good image resolution. Below the Curie point, this ratio $\epsilon_x/\epsilon'_z$ is still significantly lower, which much improves the image resolution.

Up to the present it has not been possible to utilize for the projection of televized pictures, a target cooled to below its Curie temperature. Actually, the change of state causes the systematic appearance of ferroelectric domains which on the projection screen are apparent from the display of a large number of bright vertical and horizontal lines which are distributed in a disorderly manner across the picture. These domains correspond to zones having a different atomic arrangement.

In a patent application No. 85 13 989 filed on Sept. 20, 1985 and which has not yet been published, it has been proposed to have the optical relay operate just below the Curie temperature of the target, with a final picture which does not show any deterioration due to bright disordered lines.

With the object of keeping the target at the temperature necessary for its operation, it has been proposed to provide the optical relay with a heat exchanger which acts on the target such that during normal operation of the target there are formed:
a useful central zone where it exhibits a monodomain ferroelectric phase.
and a neutral peripheral zone, having a temperature much higher than the Curie temperature, where a paraelectric phase is present.

When the ratios $\epsilon_x/\epsilon'_z$ in the paraelectric phase and in the ferroelectric phase are compared, it will indeed be found that it is possible to improve the intrinsic resolution of the target by having it operate in the ferroelectric state.

In said application the importance of operating at a temperature below the Curie point is demonstrated, the ratio $\epsilon_x/\epsilon'_z$ then becoming much lower, which distinctly improves the picture resolution of the optical relay. Typically at the spatial frequency of 1000 picture elements per line and at the nominal beam current of 60 μA, the contrast which is 11% at the usual operating temperature (−51° C.), reaches 24% when the temperature of the target is below the Curie point and that more specifically over a range of approximately 10 degrees (from −63° C. to −53° C.).

Said application has proposed to replace the centripetal cooling of the target by a centrifugal cooling.

In accordance with the normal mode of construction, the KDP target, which is rectangular, is cemented to a fluorine sheet, which is a good heat conductor. This fluorine sheet is set in a copper frame which has for its object to transfer the negative kilocalories, this frame being mounted on Peltier-effect, refrigerating elements. Thus, the target is cooled centripetally: the corners of the KDP target reach the Curie temperature first, thereafter the sides; a "cold circle" appears which defines the boundary between the two states, paraelectric in the centre and ferroelectric at the periphery. Simultaneously, in the peripheral zone which has now become ferroelectric, bright demarcation lines appear which were already found between the multiple ferroelectric domains. These domains are first microscopically small, but inevitably deteriorate the edges of the KDP target.

Said application has proposed to have the cold move progressively from the centre of the target and to prevent the cold zone from reaching the edge of the target, so as to provide that the crystal becomes ferroelectric in the centre and paraelectric at the periphery. The centre, which is the useful zone for the projection of the picture, is then ferroelectric and monodomain. This state remains stable whilst the ferroelectric central zone remains surrounded by a paraelectric peripheral zone.

Embodiments which cool the target by means of its center safeguard the optical properties of the center for the projection of the picture, but exhibit an inadequate solidity and reliability. In addition, the control of the temperature deviation between the ferroelectric zone and the paraelectric zone is very difficult to realize and is for a major part defined by the manufacture of the substrate. On the other hand the proposed embodiment is not suitable for obtaining a useful zone of rectangular shapes without a loss in useful target surface area.

SUMMARY OF THE INVENTION

According to the invention, the periphery of the electrically conducting plate is provided with a collar which is a very good heat conductor and is maintained at a temperature T1 by means of at least one thermal bridge connected to the collar and to a reference source which is maintained at a temperature T0. The plate is fixed to a plate support which is kept at a temperature T2 by the heat source, the plate projecting beyond the support along its overall circumference so that there is an annular zone in the plane of the plate and for all directions, in which there is a thermal flux which creates a temperature gradient T1–T2. The centre portion of the plate, whilst substantially being isothermal, thus creates an isothermally active portion in the target which is cemented thereto. The periphery of the target is in contact with said plate via the annular zone, the collar and the plate support having a thermal expansion coefficient which is substantially identical to that of the plate.

DETAILED DESCRIPTION OF THE PREFERRED EMBODIMENT

Figure 1:
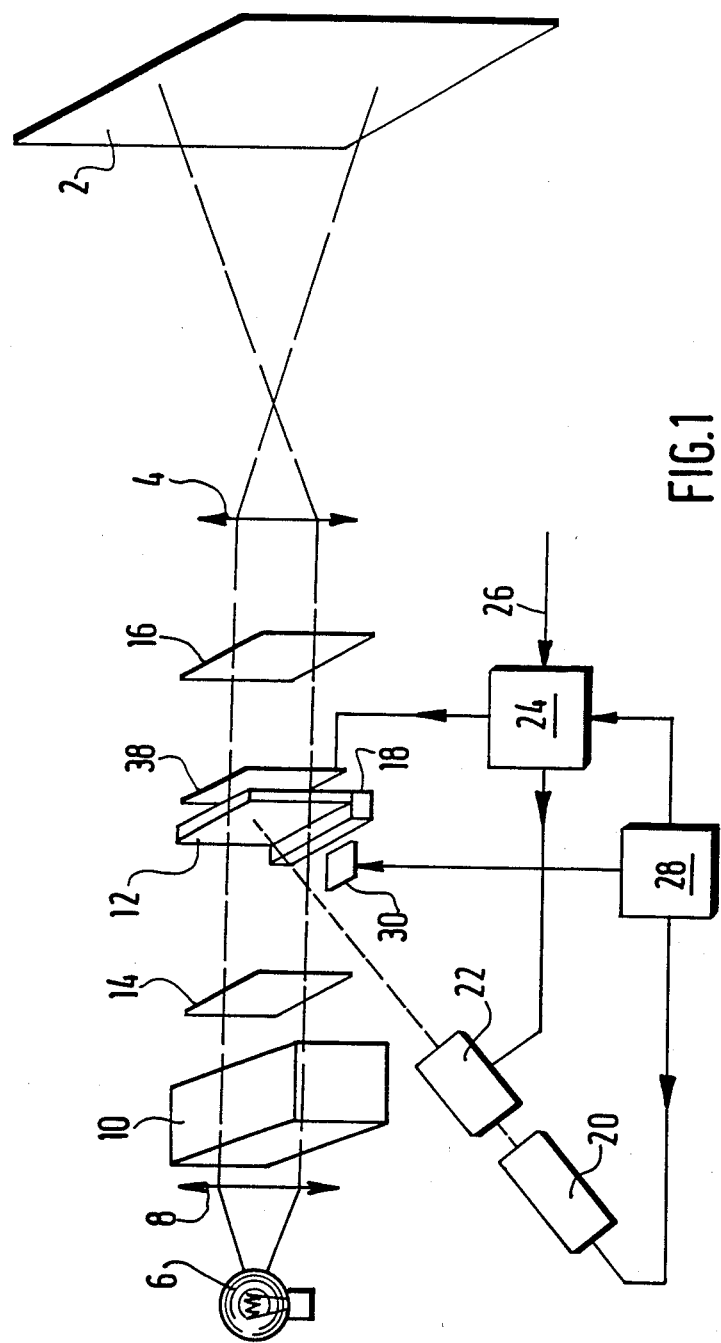
FIG. 1 is a cross-sectional view of the essential portion of the prior art optical relay.

FIG. 1 shows schematically the basic elements of an optical relay in accordance with the invention, and the elements which cooperate with this relay for obtaining a visible picture, projected onto a screen 2 via a projection lens 4. The light is produced by a lamp 6, an incandescent lamp here, but obviously any other type of lamp may be used. This light passes through a collimator lens 8, thereafter through a space 10 serving to suppress the infra-red heat rays. The optical relay is basically constituted by a target 12, consisting of a parallellepiped-shaped single crystal of KDP whose optical axis (c) is at right angles to the major faces, and is arranged between the two cross-polarizers 14 and 16 whose polarization planes are parallel to two further crystal axes (a and b) of the single crystal. A heat conductor 18 contacts the target 12 and keeps it near its Curie temperature. An electron beam represented by a broken line and coming from an electron gun 20 is directed to the left-hand face of this target. This beam periodically scans the whole useful surface of the target 12 with the aid of deflection means 22 which are controlled by scanning signals produced by a receiver 24 which processes them on the basis of the synchronizing signals applied to its input 26 together with the video information signal proper. A block 28 applies to some of the elements already mentioned in the foregoing the required direct voltages, as well as to an anode 30. For the sake of clarity, the anode is represented by a plate parallel to the light beam, as it is evident that this arrangement, which is very advantageous to the conduction of light, is not advantageous for collecting secondary electrons emitted from all the points on the surface of the target 12 on which the electron beam is incident. Therefore, in practice, the anode is arranged parallel to the face of the target 12 and very close thereto. Since the incident electron beam and the light beam have to pass the anode, the latter is designed, for example, as a grid. A sheet 38 which, by applying a thin layer of gold, for example, is electrically conductive and optically transparent is disposed behind the target 12. The receiver 24 applies the video information signal to this sheet.

Figure 2:
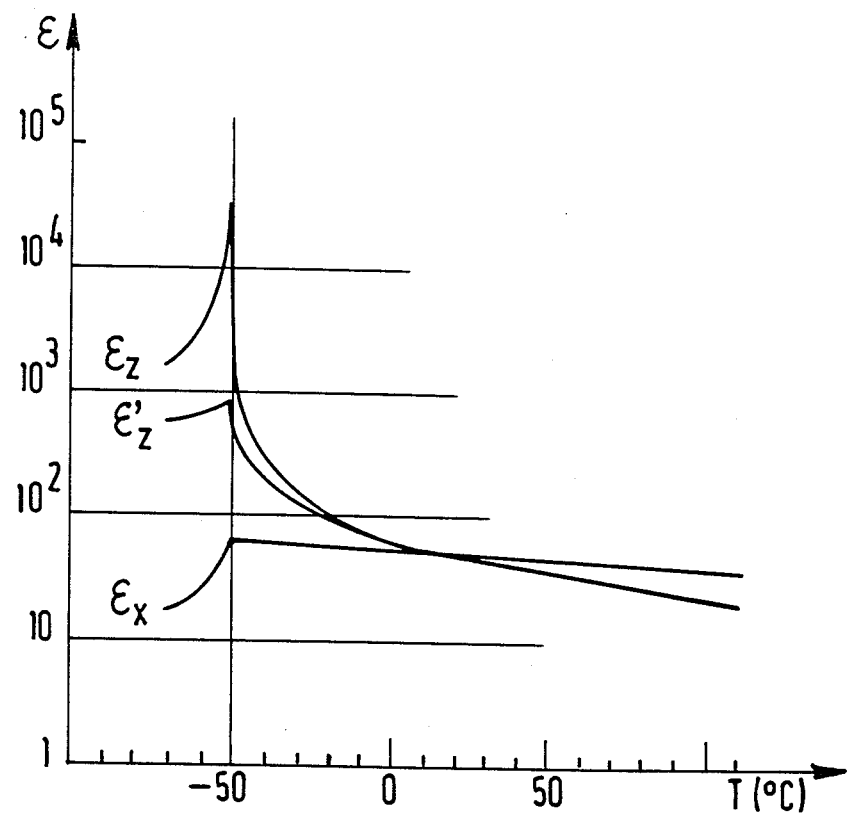
FIG. 2 shows the curves representing the variations versus temperature of the dielectric constants $\epsilon_x$, $\epsilon_z$, $\epsilon'_z$.

FIG. 2 shows the variations versus temperature of $\epsilon_x$, $\epsilon_z$, $\epsilon'_z$. It can be seen that the change from the ferroelectric phase to the paraelectric phase causes very sudden variations in the characteristics of the target and that the heat exchanger must ensure a very precise thermal situation.

Figure 3:
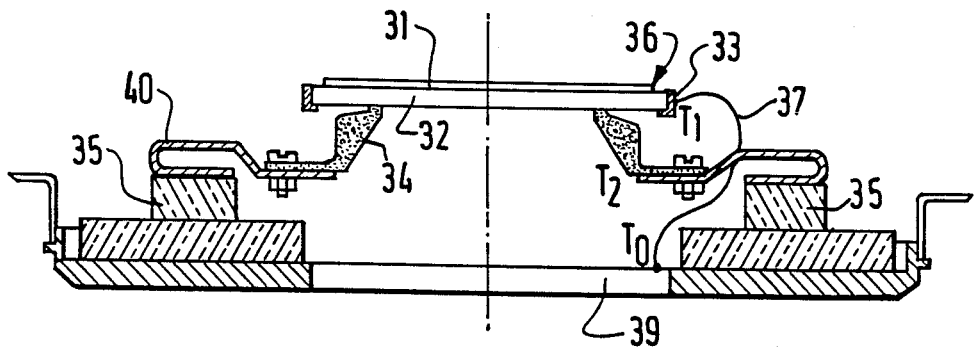
FIG. 3 shows the heat exchanger of the optical relay according to the invention.

FIG. 3 shows a heat exchanger for an optical relay according to the invention. The target of DKDP is cemented to a fluorine plate 32 having a width of 2.5 mm. Fluorine is a good thermal conductor: $360 \cdot 10^{-4}$ cal/cm/sec/degree.

The exchanger is designed to form in the centre of the target a substantially isothermal active zone and to bound an annular zone, which is placed at the periphery of the target, in which there is, in the plane of the plate and for all directions, a thermal flux creating a temperature gradient. This gradient is such that it maintains in the active zone such a target temperature so as to provide that the target is in a ferroelectric state. Similarly, it maintains in the annular zone such a target temperature that the target has, in that zone, a paraelectric state.

Thus, the active zone preserves a monodomain ferroelectric structure and the annular zone prevents its extension towards the periphery so as to provide that the monodomain is not split into a large number of smaller ferroelectric domains if its extension would cause it to reach the edge of the target.

For that purpose the target 31 is cemented to a fluorine plate 32 using, for example, an adhesive which is optically polymerizable when subjected to ultra-violet light.

The fluorine plate has a thickness of 2.5 mm. At its periphery it is provided with a collar 33 of a material which is a very good thermal conductor. The plate 32 is also cemented to a plate support 34, at the face opposite the face to which the target 31 is cemented. That part of the plate substrate 34 that is in contact with the fluorine plate is extended so as to appropriately define a substantially isothermal surface along this contact face.

A thermal gradient which is directed from the plate substrate to the collar appears between this contact face and the peripheral collar of the target.

The plate substrate 34 may be of a circular, a rectangular or a square cross-section. The latter two shapes render it possible to define a ferroelectric central active zone of a shape appropriate for the production of rectangular pictures obtained during use of the optical relay. Thus the major part of the target surface can be utilized.

The edge 36 of the target 31 must be beyond the ferroelectric active zone. It must be sufficiently removed therefrom and be located in the paraelectric zone located in the thermal gradient or beyond.

But in practice there is little sense in having the target project beyond the ring 33. This ring is of a shape matched to the size of the fluorine plate to which it is cemented. It may, for example, be circular, rectangular, square.

In order to create a thermal flux between the plate substrate 34 and the ring 33, a refrigerating element 35 applies negative kilocalories to the plate substrate 34 and at least one thermal bridge 37 discharges the negative kilocalories from the collar to a reference source 39. These thermal bridges 37 are formed by one or a plurality of copper or nickel-copper wires.

For mechanical reasons, the plate substrate 34 is mounted on the refrigerating element 35 by means of flexible elements 40.

The plate substrate 34 and the collar 33 must have a thermal expansion coefficient very near to that of the fluorine plate. Duraluminum satisfies this requirement.

Figure 4:
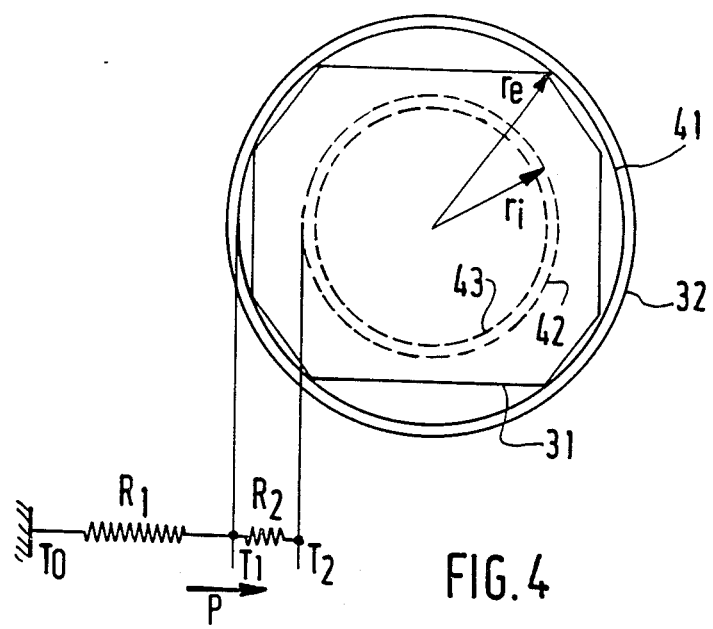
FIGS. 4 and 5 are two plan views of the target cemented to the plate.

The thermal balance of the heat exchanger determined with the aid of the parameter shown in FIG. 4 is as follows:

T1=the temperature of the collar
T2=the temperature of the plate substrate
T0=the temperature of the reference source
R1=the thermal resistance of the thermal bridge
R2=the thermal resistance of the annular zone
h2=thickness of the fluorine plate
$\lambda 2 = 18 \ W.m^{-1}.°C.^{-1}$ the thermal conductivity of the fluorine.

The conveyed thermal power is:

$$P = \frac{T0 - T1}{R1} = \frac{T1 - T2}{R2}.$$

The power radiated by the annular zone is substantially $Pr = e.\sigma S(T_3{}^4 - T_4{}^4),$ where $T_3 = T_2 + 273° \ K., \ T_4 = T_0 + 273° \ K.$ where e is the apparent emissivity of the target $\sigma$ is the Stefan-Boltzmann constant $\sigma = 5,67.10^{-8} W.m^{-2}.°K.^{-4}$ S is the surface area of the annular zone.

In actual practice Pr is much less then P and may be neglected.

The thermal resistance for an annular zone is $$R2 = \frac{Ln(re/ri)}{2\pi \cdot \lambda 2 \cdot h2}$$

where Ln is the nepierian logarithm, and re and ri are the inner and outer diameters of the annular zone.

For the following digital values:

$T1 = -51° \ C.; \ T2 = -55° \ C.; \ T0 = +20° \ C.$ $ri = 1,5.10^{-2} \ m; \ re = 2,5.10^{-2} \ m; \ h2 = 2,5.10^{-3} \ m$ it is necessary, to maintain a temperature deviation of 4° C., to convey a power of 2.2 Watts.

The thermal bridge must then have a thermal resistance such as $R1 = (T0 - T1)/P = 32,3 \ W.°C^{-1}.$ As the thermal resistance of a wire is given by $R = 4 \ l1/\pi.d1(2).\lambda 1$ where l1: wire length
d1: wire diameter
$\lambda$1: thermal conductivity by placing n wires at the periphery of the collar the resistance of the thermal bridge is: $R1 = R/n.$ For, for example, 4 copper wires and $l1 = 4.10^{-2} \ m$ $\lambda 1 = 390 \ W.m^{-1}.°C.^{-1}$ the wire diameter is d1=0.87 mm.

FIG. 4 shows the fluorine plate 32, the outer boundary 41 and the inner boundary 42 of the thermal gradient annular zone.

The active useful zone is denoted by reference numeral 43. The broken line contour illustrates one possibility of how the DKDP target can be formed.

Figure 5:
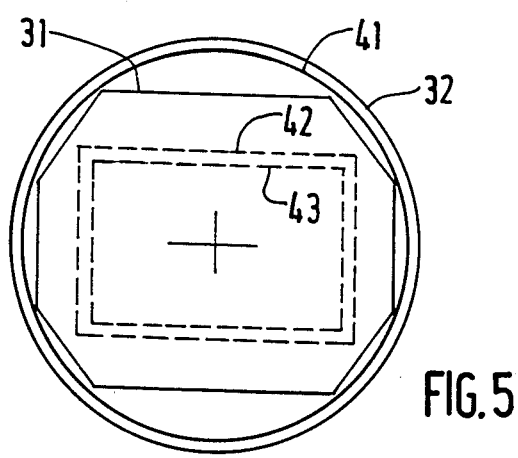

FIG. 5 shows a further embodiment in which the fluorine plate 32 is of a circular shape whilst the plate substrate has a rectangular cross-section in the region where it comes into contact with the fluorine plate. The annular zone where the thermal gradient is present has there an outer boundary 41 and an inner boundary 42. The useful active zone which is substantially isothermal is defined by the contour 43. The target 31 may be shaped as shown by the broken line contour.

The invention described in the foregoing renders it possible to provide a robust, reliable and reproducible heat exchanger. The temperature deviation T2−T1 can be easily and accurately controlled by the value of the heat bridge and the power of the refrigerating elements. The temperatures T1 and T2 are highly uniform. It is also very easy to define the dimensions of the active zone by varying the shape of the plate substrate. The shape of the active zone can also be modified by acting on the temperature gradient which can be accurately controlled.

What is claimed is:

1. An optical relay comprising a target (12, 31) of electrically insulating material which allows the light to pass in a manner depending on the electric field parallel to the direction of propagation of this light, means (20, 22, 24) for having a first face of this target scanned by an electron beam, an anode (30) suitable for receiving the secondary electrons transmitted in response to the action of the beam, an optically transparent and electrically conducting plate provided against the second face of the target, this plate receiving the electric signal conveying the video information and thus forming the control electrode, the target being made of a material which becomes ferroelectric below a given temperature, the Curie temperature, and a heat exchanger (18) connected to a heat source which maintains the temperature necessary for its operation and acts on the target which is bonded to a plate (32) of an adequately heat conducting material, so that during the normal mode of operation the target is formed by:

a useful centre zone where it exhibits a single-domain ferroelectric phase and a neutral peripheral zone having a temperature higher than the Curie temperature, where it exhibits a paraelectric phase, characterized in that said plate (32) is provided at its periphery with a collar (33) which is a very good heat conductor and is maintained at a temperature T1 by means of at least one thermal bridge which is connected to the collar and to a reference source (39) which is maintained at a temperature T0, said plate being fixed to a plate support (34) which is kept at a temperature T2 by the heat source, said plate projecting beyond the support along its overal circumference so that in said plate there is an annular zone in which, in the plane of the plate and for all directions, there is a thermal flux which creates a temperature gradient T1-T2, the centre portion of said plate whilst substantially being isothermal, thus creates an isothermally active portion in the target which is cemented thereto, the periphery of the target being in contact with said plate via the annular zone, the collar (33) and the plate support (34) having a thermal expansion coefficient which is substantially identical to that of said plate.

2. An optical relay as claimed in claim 1, characterized in that the plate (32) is made of fluorine and the collar (33) and the plate support (34) are made of duraluminum.

3. An optical relay as in claim 1, characterized in that the thermal bridge (37) is constituted by at least one copper or nickel-copper wire.

4. An optical relay as in claim 1, characterized in that the plate support (34) is in contact with the plate in accordance with a rectangular zone, which creates in the target an isothermal active portion of a rectangular shape.

5. An optical relay as in claim 1, characterized in that the plate support (34) is in contact with the plate in accordance with a square zone, which creates in the target an active isothermal portion of a square shape.

* * * * *